May 15, 1928.
R. MARLOW
1,670,266
WINDSHIELD WIPER
Filed Oct. 22, 1926
Fig. 1.
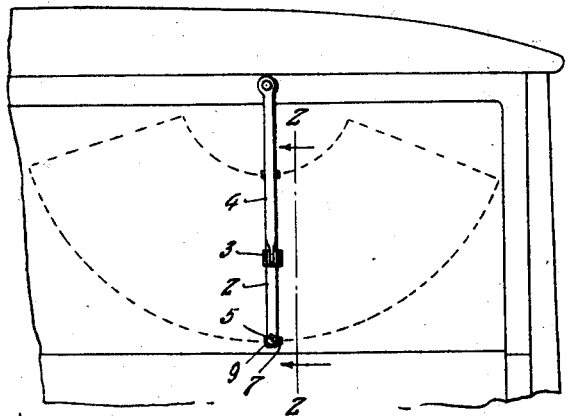
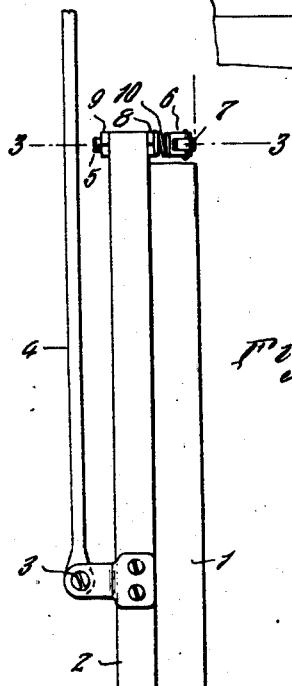
Fig. 2.
Fig. 3.
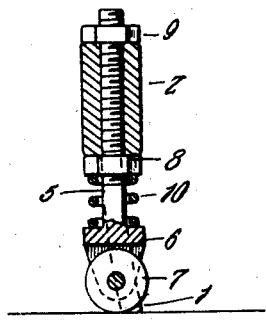
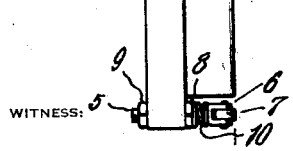
Reidar Marlow
INVENTOR
BY Victor J. Evans
ATTORNEY Patented May 15, 1928.

1,670,266

UNITED STATES PATENT OFFICE.

REIDAR MARLOW, OF GREENWICH, CONNECTICUT.

WINDSHIELD WIPER.

Application filed October 22, 1926. Serial No. 143,447.

My present invention has reference to a windshield wiper for automobiles, and my object is the provision of a means for regulating the contact of the rubber wiper or squeegee with the windshield, so that a pressure of the squeegee against the glass will be at all times properly regulated to assure the cleaning of the glass without injury to the rubber squeegee.

To the attainment of the foregoing, the invention consists in the improvement as hereinafter described and definitely claimed.

In the drawings:

Figure 1 is a fragmentary elevation of an automobile illustrating the application of my improvement thereon.

Figure 2 is a side elevation of the improvement.

Figure 3 is a sectional view on the line 3—3 of Figure 2.

The rubber wiper or squeegee 1 is supported in the usual manner, in a metal frame or body 2. The frame 2 is pivotally supported, as at 3, on the swingable operating rod 4. The rod may be connected to the power plant of the automobile or the windshield wiper may be manually operated.

The rubber squeegee 1 does not extend the entire length of the frame or body 2. The ends of the said frame or body may be solid and passing through these ends there are threaded shafts 5. These shafts have on their outer ends bearings 6 for the shafts of rubber rollers 7. The threaded shaft is engaged by inner and outer nuts 8 and 9, which contact respectively with the inner and outer faces of the body or frame 2. Also surrounding each shaft 5 and exerting a tension between the nuts 8 and the bearings 6 there are helical springs 10. The springs 10 serve to urge the rollers outwardly through the frame 2 when the nuts 8 and 9 are unscrewed.

The shafts 5 are adjusted to bring the rubber rollers 7 in proper contact with the windshield so as to regulate the pressure of the squeegee 1 against said windshield and by such simple arrangement the pressure of the squeegee against the glass plate is properly regulated to insure the plate being effectively wiped to remove all moisture therefrom without injury to the windshield wiper. Too much pressure upon the squeegee or the windshield wiper causes the binding thereof against the glass plate when in operation and when not in operation the rubber will twist when the same is allowed to dry, while, of course, not enough pressure will cause the rain to blur on the windshield so it is thought the simplicity of my invention and the advantages thereof will be understood and appreciated by those skilled in the art to which such invention relates.

Having described the invention, I claim:—

A squeegee-carrying frame swingably supported for wiping engagement with a transparent plate, said frame, at the ends thereof having threaded shafts passing therethrough, and a bearing on each shaft for a rubber roller, nuts screwed in the threaded shaft and contacting with the opposite edges of the frame, and a spring on each shaft exerting a tension between the bearing and the nut adjacent to said bearing.

In testimony whereof I affix my signature.

REIDAR MARLOW.